(12) United States Patent
Chang et al.

(10) Patent No.: US 9,792,341 B2
(45) Date of Patent: Oct. 17, 2017

(54) DATABASE QUERY PROCESSING USING HORIZONTAL DATA RECORD ALIGNMENT OF MULTI-COLUMN RANGE SUMMARIES

(71) Applicant: International Business Machines Corporation, Armonk, NY (US)

(72) Inventors: Yuan-Chi Chang, Armonk, NY (US); Mohammad S. Hamedani, White Plains, NY (US); Oktie Hassanzadeh, White Plains, NY (US); Timothy R. Malkemus, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 14/293,827

(22) Filed: Jun. 2, 2014

(65) Prior Publication Data

US 2015/0347549 A1  Dec. 3, 2015

(51) Int. Cl.
  *G06F 7/00* (2006.01)
  *G06F 17/00* (2006.01)
  *G06F 17/30* (2006.01)

(52) U.S. Cl.
  CPC .. *G06F 17/30575* (2013.01); *G06F 17/30312* (2013.01); *G06F 17/30489* (2013.01)

(58) Field of Classification Search
  CPC ................................. G06F 17/30575
  USPC ....................................... 707/610
  See application file for complete search history.

(56) References Cited

U.S. PATENT DOCUMENTS

| 7,483,873 | B2* | 1/2009 | Bhattacharjee ... | G06F 17/30306 |
| 2010/0228752 | A1* | 9/2010 | Folting ................. | G06F 17/246 |
| | | | | 707/758 |
| 2012/0246154 | A1 | 9/2012 | Duan et al. | |
| 2013/0151491 | A1* | 6/2013 | Gislason ........... | G06F 17/30339 |
| | | | | 707/696 |
| 2017/0031621 | A1* | 2/2017 | Brady ................... | G06F 3/0629 |

FOREIGN PATENT DOCUMENTS

WO   2004042617 A1   5/2004

OTHER PUBLICATIONS

"An Index-Directed Greedy Algorithm for the Optimization of Star Schema Queries," IBM Corporation, IP.com Prior Art Database Technical Disclosure No. IPCOM000021775D, Feb. 6, 2004, 4 pages.

"Autonomic performance optimization of queries with Group by or Distinct," IBM Corporation, IP.com Prior Art Database Technical Disclosure No. IPCOM000134744D, Mar. 18, 2006, 7 pages.

* cited by examiner

*Primary Examiner* — Kimberly Wilson
(74) *Attorney, Agent, or Firm* — Yee & Associates, P.C.; Alexa Ashworth

(57) ABSTRACT

Organizing data within a database is provided. In response to determining that a group of coarsified data records within a database table is not an aligned group of data records, a virtually replicated subgroup of coarsified data records that corresponds to the group of coarsified data records is generated from different groups of coarsified data records within the database table. The virtually replicated subgroup of coarsified data records is aligned with the corresponding group of coarsified data records.

25 Claims, 14 Drawing Sheets

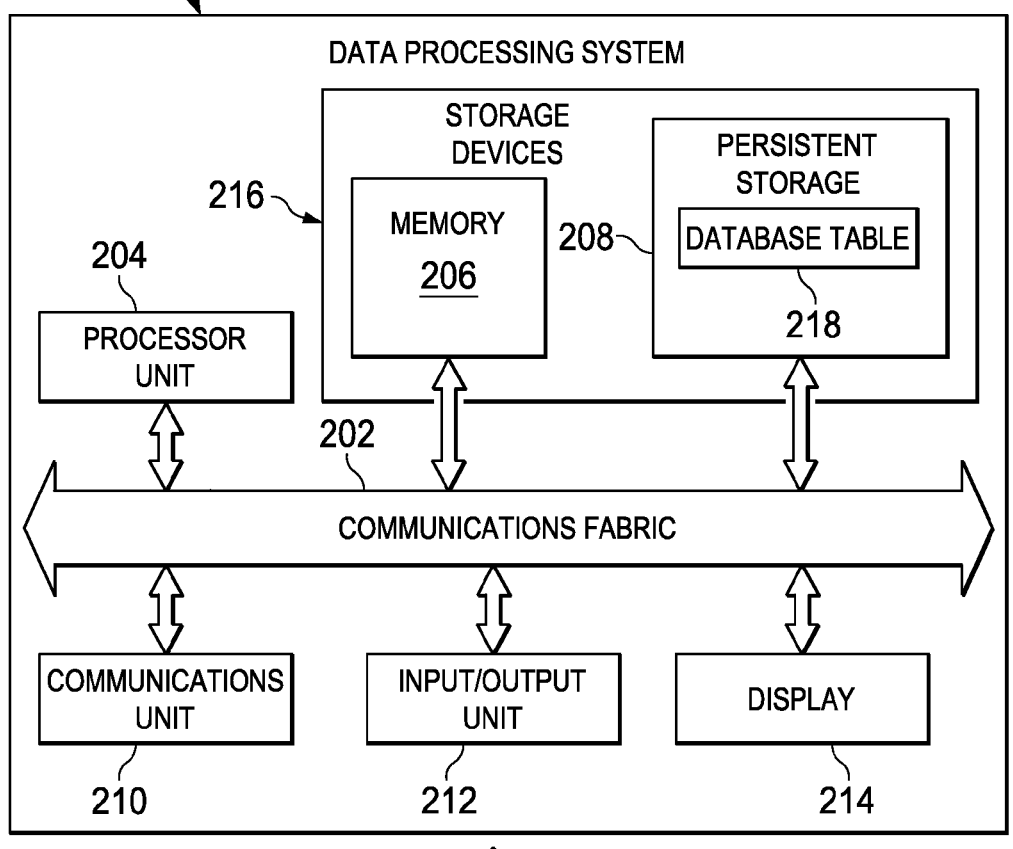
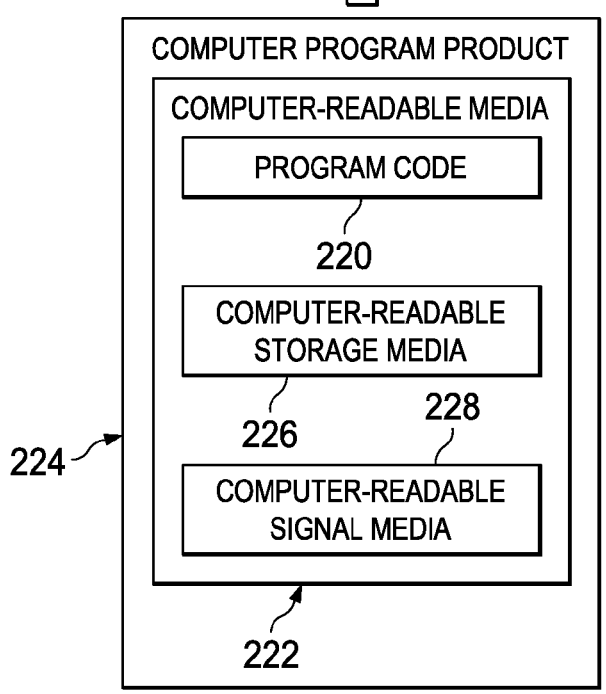
FIG. 2

DETERMINING CORRELATED COLUMN SETS PROCESS 300

COLUMNS 304

DATABASE TABLE 302

| | X | A | Y | B | Z | C | D | ... |
|---|---|---|---|---|---|---|---|---|
| 1 | | $a_1$ | | $b_1$ | | $c_1$ | $d_1$ | |
| 2 | | $a_1$ | | $b_1$ | | $c_3$ | $d_5$ | |
| 3 | | $a_1$ | | $b_3$ | | $c_1$ | $d_8$ | |
| 4 | | $a_2$ | | $b_2$ | | $c_2$ | $d_1$ | |
| 5 | | $a_2$ | | $b_2$ | | $c_2$ | $d_9$ | |
| 6 | | $a_3$ | | $b_3$ | | $c_1$ | $d_2$ | |

306 ROWS

CORRELATED COLUMN SET 310 / CORRELATED COLUMN SET 310

| | X | A | Y | B | Z | C | D | ... |
|---|---|---|---|---|---|---|---|---|
| 1 | | $a_1$ | | $b_1$ | | $c_1$ | $d_1$ | |
| 2 | | $a_1$ | | $b_1$ | | $c_3$ | $d_5$ | |
| 3 | | $a_1$ | | $b_3$ | | $c_1$ | $d_8$ | |
| 4 | | $a_2$ | | $b_2$ | | $c_2$ | $d_1$ | |
| 5 | | $a_2$ | | $b_2$ | | $c_2$ | $d_9$ | |
| 6 | | $a_3$ | | $b_3$ | | $c_1$ | $d_2$ | |

CORRELATED COLUMN SET 308 / CORRELATED COLUMN SET 308

| | X | A | Y | B | Z | C | D | ... |
|---|---|---|---|---|---|---|---|---|
| 1 | | $a_1$ | | $b_1$ | | $c_1$ | $d_1$ | |
| 2 | | $a_1$ | | $b_1$ | | $c_3$ | $d_5$ | |
| 3 | | $a_1$ | | $b_3$ | | $c_1$ | $d_8$ | |
| 4 | | $a_2$ | | $b_2$ | | $c_2$ | $d_1$ | |
| 5 | | $a_2$ | | $b_2$ | | $c_2$ | $d_9$ | |
| 6 | | $a_3$ | | $b_3$ | | $c_1$ | $d_2$ | |

308 CORRELATED COLUMN SET

FIG. 3

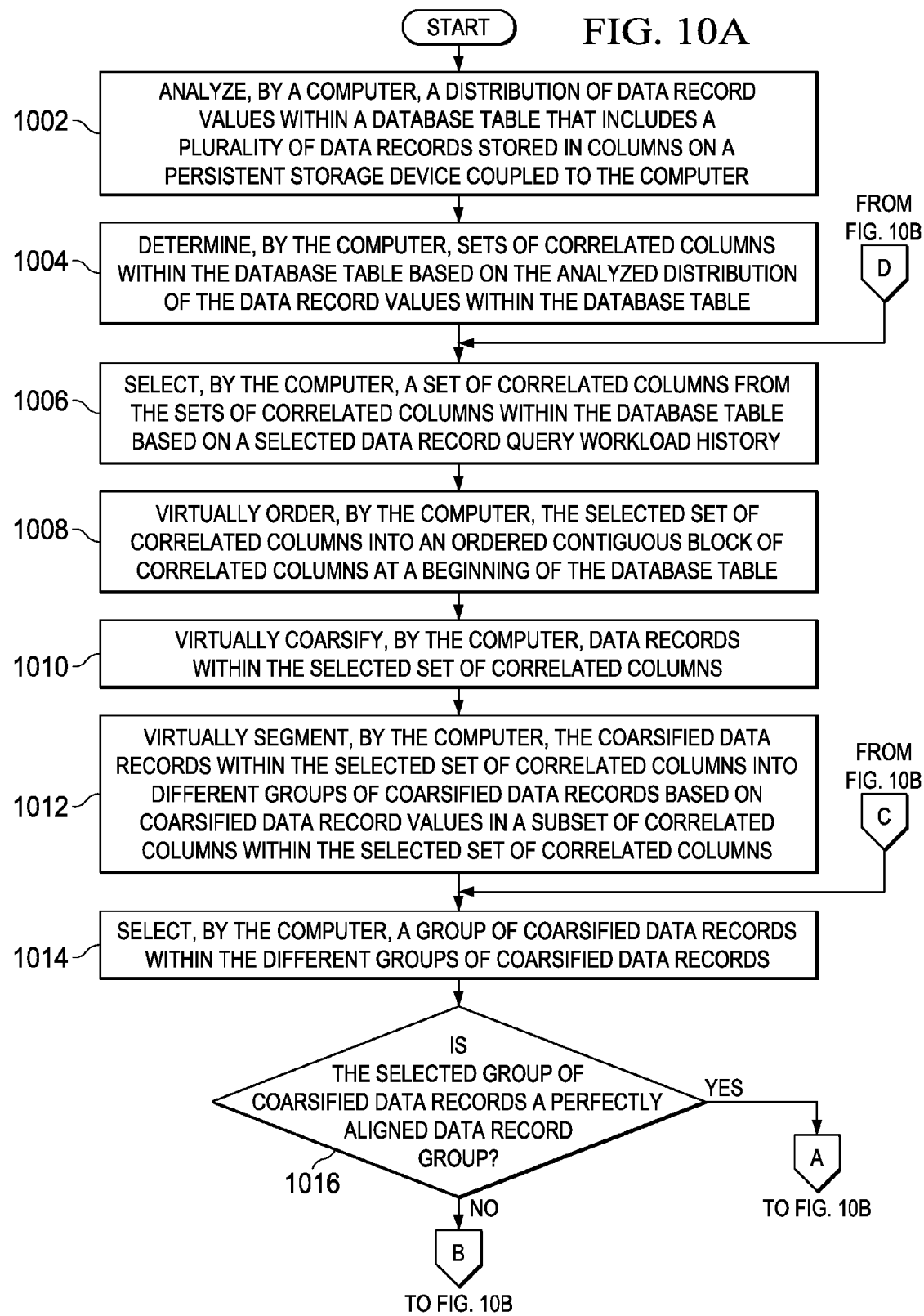

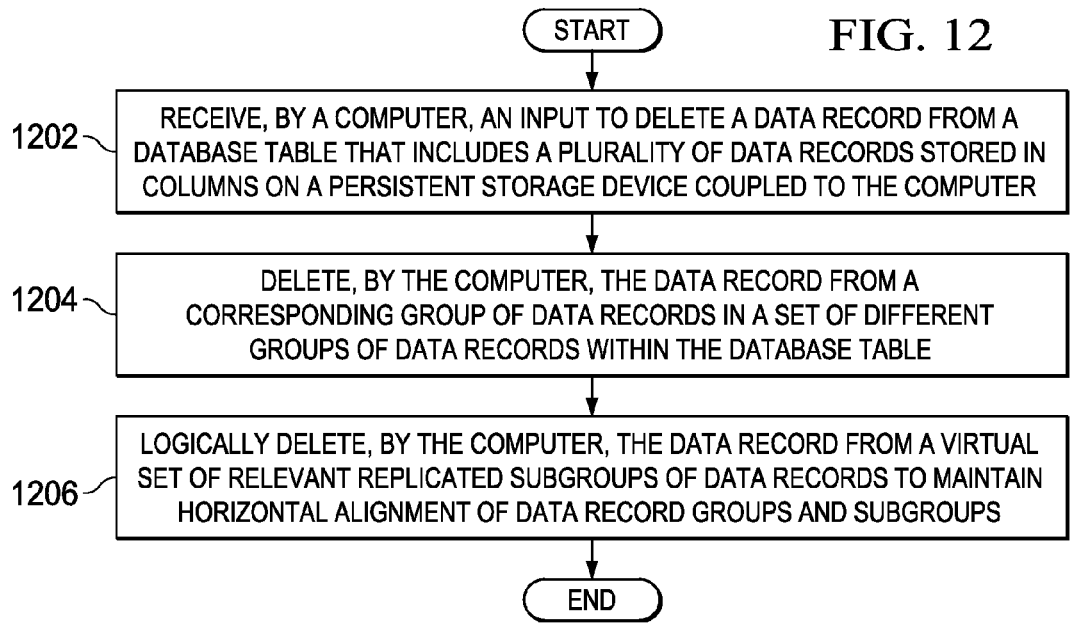
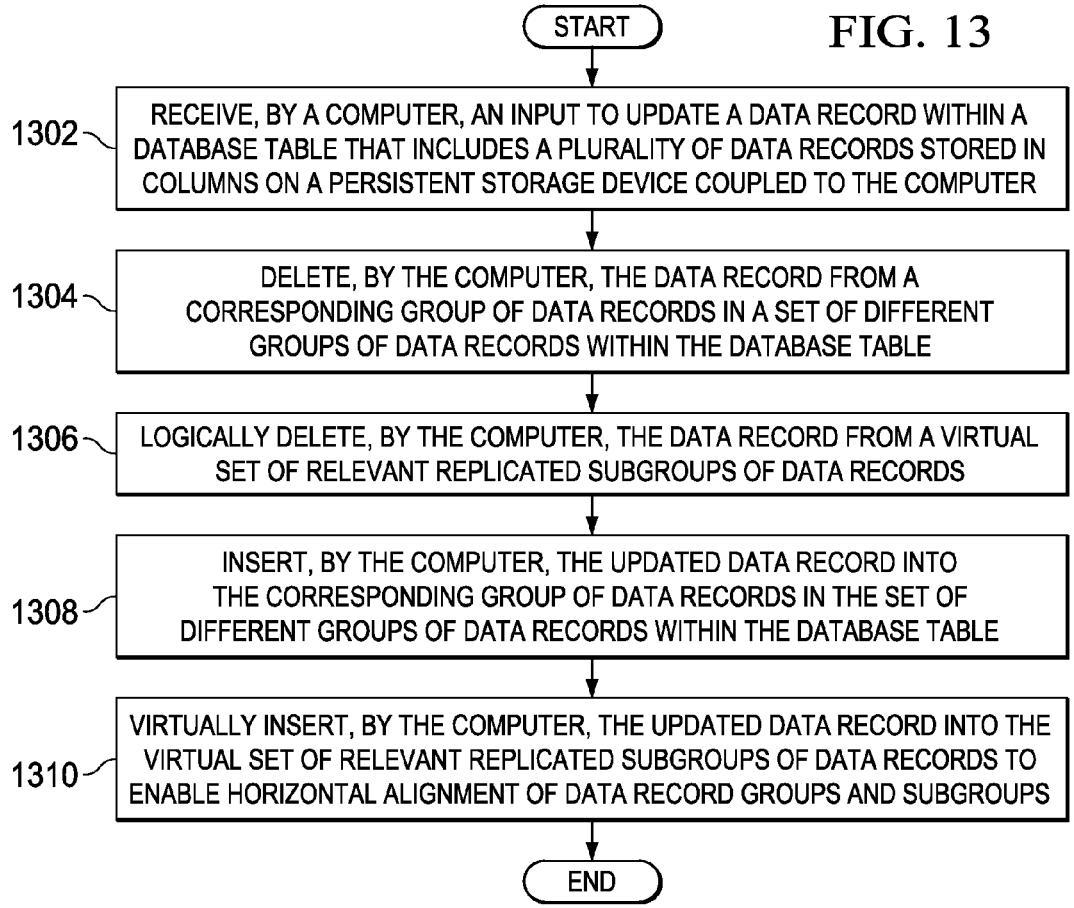

DATABASE QUERY PROCESSING USING HORIZONTAL DATA RECORD ALIGNMENT OF MULTI-COLUMN RANGE SUMMARIES

BACKGROUND

1. Field

The disclosure relates generally to database query processing and more specifically to processing analytical database queries using horizontal alignment of data record groups and corresponding subgroups within correlated columns of multi-column range summaries.

2. Description of the Related Art

Traditional analytical query processing is limited by the need to identify and maintain a multitude of indexes for data records. Analytical queries aggregate data record values based on a group of data record rows. Analytical queries are commonly used for running totals, moving averages, or top-N results within a group of data records. Identifying the correct indexes for analytical query processing has been a challenge in real-world applications and has been a burden on database administrators. In addition, maintaining a multitude of indexes increases the update overhead cost in transaction processing and in operational data stores. Further, all changes to indexes must be logged, which is another overhead cost.

SUMMARY

According to one illustrative embodiment, a computer-implemented method for organizing data within a database is provided. In response to a computer determining that a group of coarsified data records within a database table is not an aligned group of data records, the computer generates a virtually replicated subgroup of coarsified data records that corresponds to the group of coarsified data records from different groups of coarsified data records within the database table. The computer aligns the virtually replicated subgroup of coarsified data records with the corresponding group of coarsified data records. According to other illustrative embodiments, a computer system and a computer program product for organizing data within a database are provided.

BRIEF DESCRIPTION OF THE SEVERAL VIEWS OF THE DRAWINGS

FIG. 2 is a diagram of a data processing system in which illustrative embodiments may be implemented;

FIG. 3 is a diagram illustrating a process for determining correlated column sets in accordance with an illustrative embodiment;

FIGS. 10A-10B are a flowchart illustrating a process for horizontally aligning data record groups and replicated subgroups in accordance with an illustrative embodiment;

FIG. 12 is a flowchart illustrating a process for deleting a data record from a database table in accordance with an illustrative embodiment;

FIG. 13 is a flowchart illustrating a process for updating a data record in accordance with an illustrative embodiment.

DETAILED DESCRIPTION

Figure 1:
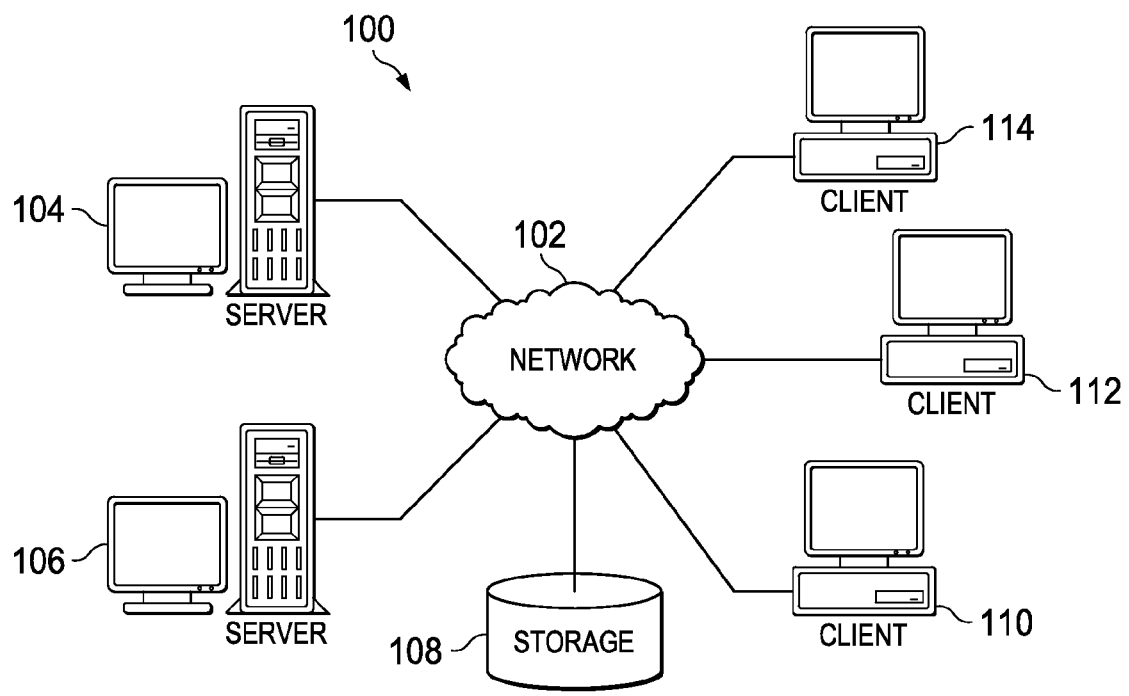
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other data processing devices in which the illustrative embodiments may be implemented. Network data processing system 100 contains network 102, which is the medium used to provide communications links between the computers and the other data processing devices connected together within network data processing system 100. Network 102 may include connections, such as wire communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 and/or server 106 may provide services to client devices connected to network 102. For example, server 104 and/or server 106 may provide a service for processing analytical data record queries submitted by client devices.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 utilize clients 110, 112, and 114 to access the services provided by server 104 and/or server 106.

Clients 110, 112, and 114 may be, for example, personal computers, network computers, and/or portable computers, such as laptop computers, with wire and/or wireless communication links to network 102. In addition, clients 110, 112, and 114 also may represent mobile data processing systems, such as cellular telephones, smart phones, personal digital assistants, gaming devices, or handheld computers, with wireless communication links to network 102. It should be noted that clients 110, 112, and 114 may represent any combination of computers and mobile data processing systems connected to network 102.

Storage 108 is a network storage device capable of storing data in a structured or relational format. Storage 108 may be, for example, an operational data store, data warehouse, or database. Storage 108 may provide storage of a plurality of different types of data records and history information regarding query workloads and results associated with each of the different types of data records. The data records may store any type of information and/or values. Further, storage unit 108 may store other data, such as authentication or credential data that may include user names, passwords, and/or biometric data associated with a plurality of users and/or system administrators.

Also, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores database table 218. However, it should be noted that persistent storage 208 may store any type of application, program, module, and data utilized by the different illustrative embodiments. Database table 218 is a relational database table that stores a plurality of data records in a structured format in columns and rows. The data records stored in database table 218 may represent any type of data or information and may include any type of characteristics, attributes, or values.

Communications unit 210, in this example, provides for communication with other data processing systems and computing devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as system administrator. In addition, display 214 may include touch screen capabilities to receive user input.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200. In some instances, computer readable storage media 226 may not be removable from data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 220 may be downloaded over a network to persistent storage 208 from another device or data processing system through computer readable signal media 228 for use within data processing system 200. For instance, program code stored in a computer readable storage media in a data processing system may be downloaded over a network from the data processing system to data processing system 200. The data processing system providing program code 220 may be a server computer, a client computer, or some other device capable of storing and transmitting program code 220.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 226 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that the process of identifying and maintaining a multitude of indexes for data record queries incurred a high processing overhead. As a result, a new process for speeding up data record queries was explored using multi-column range summaries on sets of correlated columns of data records within a database table. A multi-column range summary is a table that identifies ranges of data record values corresponding to each column of an ordered set of correlated columns within each different data record group identified in the ordered set of correlated columns. A multi-column data record range summary table enables the speeding up of a database query, which has a set of one or more predicates defined on the ordered set of correlated columns, by quickly pruning or eliminating different groups of data records that are shown in the multi-column data record range summary table to not match the set of query predicates. A query predicate restricts which data record rows within the database table are returned by the query. In other words, the query predicate eliminates all data record rows from the query result that do not evaluate to "True". For example, if a query predicate defines a particular data record value or a particular range of data record values, then only those data record values that satisfy the query predicate are included in the result and all other data record values are pruned or eliminated from the result.

A limiting factor with using multi-column range summaries is that data records must be sorted based on the ordered set of correlated columns and that queries are forced to have a predicate defined on the first column of the ordered set of correlated columns. Illustrative embodiments extend the use of multi-column range summaries by, for example, pruning or reducing the data record search space and terminating data record searches earlier, thereby supporting a larger class of queries (i.e., those queries that have predicates defined on columns other than the first column of an ordered set of correlated columns). Correlated means that the data record columns have corresponding or similar attributes, characteristics, or values.

Illustrative embodiments utilize coarsification of data records, if needed, within a set of correlated columns. Coarsification reduces the cardinality (i.e., the number of distinct or unique values) of data records within a column or group of data records. For example, coarsification of data records that include dates, which include day, month, and year, may drop the day and month values and only keep the year value for coarsification of the dates. Cardinality refers to the uniqueness of data record values contained within a particular column of a database table. For example, the lower the cardinality of a column, the more duplicated data record values are within that column.

Illustrative embodiments also selectively replicate subgroups of data records to generate horizontally aligned data record groups and subgroups on the set of coarsified and correlated data record columns. As a result, illustrative embodiments are able to answer analytical queries efficiently, as long as the queries have a predicate defined on any of the correlated columns in a set of correlated columns. It should be noted that a higher correlation between data records within the set of correlated columns naturally results in a lower replication of data record subgroups. Thus, illustrative embodiments utilize a horizontal alignment of data record groups with their corresponding virtually replicated data record subgroups using data record coarsification of a set of correlated columns and selective replication of data record subgroups to generate aligned data record groups and subgroups over the set of correlated columns to speed up analytical queries. Illustrative embodiments do not store or materialize any of the virtually replicated data record subgroups. Illustrative embodiments align the data record groups and corresponding virtually replicated data record subgroups by values or content. For example, if a data record point query is for data record $c_1$, then illustrative embodiments retrieve all data record groups and subgroups that include the data record $c_1$.

Horizontal data record alignment means that data records are replicated across multi-column range summaries to obtain a better sort order through coarsification of data records within a set of highly correlated columns of data records. For example, ORDER DATE, INVOICE DATE, SHIPPING DATE, and PAYMENT DATE columns of a database table are likely to be highly correlated columns based on a Year value. In determining the sort order, illustrative embodiments sort a single Year value for all the columns and the same data record identifier may appear more than once if more than one distinct data record value exists across the set of correlated columns.

For example, consider ORDER DATE, INVOICE DATE, SHIPPING DATE, and PAYMENT DATE as a set of correlated columns. If a data record row includes values of '2011-1-2', '2011-1-10', '2011-1-30', and '2011-2-10' for the respective columns, then illustrative embodiments place that data record row within a YEAR 2011 group of data records. A group of data records refers to a block, chunk, or set of data records having same or similar values or characteristics. A query predicate defined on any correlated column in the set of correlated columns (e.g., on the ORDER DATE column, the INVOICE DATE column, the SHIPPING DATE column, or the PAYMENT DATE column) for the Year 2011 returns that data record.

Now, if a data record row includes the values of '2011-12-2', '2011-12-10', and '2011-12-30' within the ORDER DATE, INVOICE DATE, and SHIPPING DATE columns and the PAYMENT DATE column includes the value of '2012-1-10', then illustrative embodiments place that data record row within both YEAR 2011 and YEAR 2012 data record groups. A query predicate defined on any correlated column in the set of correlated columns for the Year 2011, the Year 2012, or both Years 2011 and 2012 returns that data record. If a data record row includes the values of '2009-1-2', '2010-1-10', '2011-1-30', and '2012-2-10', respectively, for the correlated columns, then illustrative embodiments place that data record row within each of the YEAR 2009, YEAR 2010, YEAR 2011 and YEAR 2012 data record groups. A query predicate defined on any correlated column in the set of correlated columns for Year 2009 to YEAR 2012 returns that data record.

The horizontal data record alignment of illustrative embodiments has a bound or limit on the number of virtual replications of data records within the set of correlated columns. For example, illustrative embodiments may virtually replicate a data record at most k−1 number of times, where k is the number of correlated columns in the set of correlated columns. Consequently, illustrative embodiments limit the number of data record replications. Typically, for a set of correlated columns, only a few data record outliers will need to be replicated k number of times. Thus, illustrative embodiments are unlike indexes (and materialized views) in that an index is created on an entire column or no index is created at all, which essentially is an all or nothing replication scheme, and an index does not support selective data record-level replication. Another benefit of illustrative embodiments is that selective data record replication produces clustered data records (implicit clustered indexes), while indexes may be unclustered causing significant processing overhead. Also, horizontal data record alignment allows selective data record replication only within certain columns (e.g., a set of correlated columns) of a database table.

It should be noted that multi-column data record range summaries, with or without horizontal data record alignment, are beneficial because of lower update costs and fewer database objects to maintain, which requires less database administrator involvement in tuning, maintaining, and replicating of these objects. In short, the horizontal data record alignment of illustrative embodiments pushes the limit of multi-column data record range summaries to autonomously speed up the processing of analytical queries. Further, it should be noted that a hybrid approach also is possible by combining the multi-column data record range summaries with indexes and materialized views. One motivation behind such a hybrid approach is to utilize the autonomous and low-maintenance nature of multi-column range summaries and to utilize fewer instances of indexes and materialized views to reduce the maintenance and storage costs associated with them.

The horizontal data record alignment of illustrative embodiments may require an extra bit to indicate which data records are master data records and which are duplicate or replicated data records at either a data record level or a data record group level. Illustrative embodiments may utilize the extra bit to determine whether a data record has already been read and, therefore, should be skipped. Similar bit validation mechanisms already exist, such as, for example, to invalidate deleted records. Alternatively, illustrative embodiments may allocate a few separate pages within each data record group to maintain replicated data record subgroups, which may be called mini-Groups or m-Groups. Thus, illustrative embodiments may distinguish between replicated data record subgroups and non-replicated data record groups without any additional bit checking. In addition, by separating replicated data record subgroups from non-replicated data record groups on a group level basis, illustrative embodiments may efficiently skip replicated data record subgroups by considering both the predicates of a query and the multi-column data record summaries on the database table. For example, if an illustrative embodiment is performing a database table scan, then the illustrative embodiment may skip all replicated data record subgroups or m-Groups.

In general, for data record range queries or data record point queries, illustrative embodiments may only search the replicated data record subgroup at the boundary of the data record groups or the last data record group that satisfies the data record value range of the query. Illustrative embodiments may ignore the rest of the replicated data record subgroups. A stronger condition may be applied to account for gaps in the data record value range of the query.

Alternatively, for data record range queries or data record point queries, illustrative embodiments may first scan the multi-column data record range summaries to determine all matching data record groups within correlated columns and non-correlated columns that satisfy a query predicate. If a query predicate is defined on a first correlated column in a set of correlated columns, then illustrative embodiments may skip all replicated data record subgroups that correspond to the matching data record groups. In other words, all data records searched for based on the query predicate are in the matching non-replicated data record groups, so illustrative embodiments do not have to search any corresponding replicated data record subgroups. If no query predicate is defined on the first correlated column in a set of correlated columns, then illustrative embodiments may scan all replicated data record subgroups that correspond to the matching data record groups.

Also, for each data record in the replicated data record subgroups, if a particular data record is included in one of the matching data record groups, then illustrative embodiments may skip that particular data record because that particular data record has already been read. Thus, illustrative embodiments prevent reading the same data record more than once. Illustrative embodiments may apply a stronger condition here for skipping an entire replicated data record subgroup, such as, for example, when determining the presence of continuous data record ranges within the multi-column data record range summaries.

Thus, illustrative embodiments of the present invention provide a computer-implemented method, computer system, and computer program product for organizing data within a database. In response to a computer determining that a group of coarsified data records within a database table is not an aligned group of data records, the computer generates a virtually replicated subgroup of coarsified data records that corresponds to the group of coarsified data records from different groups of coarsified data records within the database table. In addition, the computer aligns the virtually replicated subgroup of coarsified data records with the corresponding group of coarsified data records.

With reference now to FIG. 3, a diagram illustrating a process for determining correlated column sets is depicted in accordance with an illustrative embodiment. Determining correlated column sets process 300 may be implemented in a computer, such as data processing system 200 in FIG. 2. Determining correlated column sets process 300 utilizes database table 302. Database table 302 may be, for example, database table 218 in FIG. 2.

Database table 302 stores a plurality of data records in columns and rows, such as columns 304 and rows 306. The first step in horizontal data record alignment is identification of one or more sets of correlated columns. In this example, columns A, B, and C within columns 304 are one set of correlated columns (i.e., correlated column set 308). In addition, columns Y and Z within columns 304 are another set of correlated columns (i.e., correlated column set 310).

Determining correlated column sets process 300 determines a set of correlated columns by analyzing a distribution of data record values within columns 304. Determining correlated column sets process 300 may determine that a set of columns are correlated when data records within particular columns include values that are the same or similar. Determining correlated column sets process 300 may utilize, for example, statistical analysis, correlation and frequency analysis, cardinality analysis, frequently co-occurring set analysis, and the like to determine the sets of correlated columns. In addition, illustrative embodiments may determine a set of correlated columns based on a history of query workloads and query distributions. For example, illustrative embodiments may utilize frequency of query predicates defined on a set of correlated columns in a query workload, semantics and ontology of the database table and schema, and the like.

Figure 4:
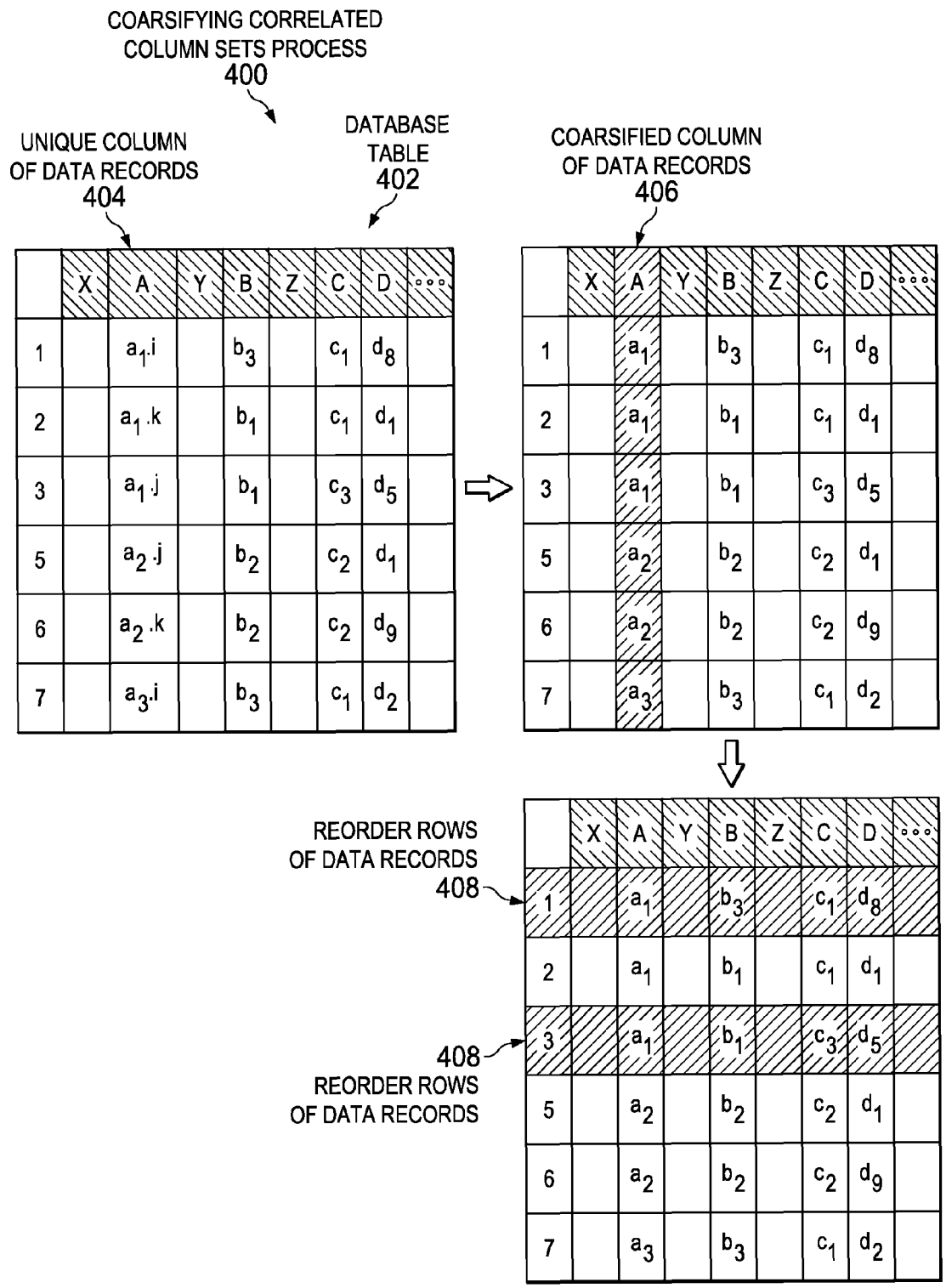
FIG. 4 is a diagram illustrating a process for coarsifying correlated column sets in accordance with an illustrative embodiment.

With reference now to FIG. 4, a diagram illustrating a process for coarsifying correlated column sets is depicted in accordance with an illustrative embodiment. Coarsifying correlated column sets process 400 may be implemented in a computer, such as data processing system 200 in FIG. 2. Coarsifying correlated column sets process 400 utilizes database table 402, such as database table 302 in FIG. 3. In this example, database table 402 includes unique column of data records 404 in column A.

Once illustrative embodiments identify a set of correlated columns, such as correlated column set 308 of columns A, B, and C in FIG. 3, then coarsifying correlated column sets process 400 coarsifies data records within the set of correlated columns to reduce the cardinality of the data records. Coarsifying correlated column sets process 400 reduces the cardinality of data record values within unique column of data records 404 to the values shown within coarsified column of data records 406. For example, unique column of data records 404 in correlated column A includes the data record values of $a_1.i$, $a_1.k$, $a_1.j$, $a_2.j$, $a_2.k$, and $a_3.i$ for rows 1-7, respectively. After coarsification, coarsified column of data records 406 in correlated column A now includes the data record values of $a_1$, $a_1$, $a_1$, $a_2$, $a_2$, and $a_3$ for rows 1-7, respectively. Thus, coarsifying correlated column sets process 400 reduced the cardinality of data record values in correlated column A of database table 402. As a result of the coarsification process to reduce the cardinality of data record values of correlated column A, coarsified correlated column A now only includes three different groups of data records (i.e., $a_1$, $a_2$, and $a_3$) instead of seven (i.e., $a_1.i$, $a_1.k$, $a_1.j$, $a_2.j$, $a_2.k$, and $a_3.i$).

In addition, coarsifying correlated column sets process 400 may generate a larger size data record group. Generating larger data record groups results in better alignment of data record groups and subgroups and more effective query result pruning. For example, if a set of columns are determined to be correlated and the first correlated column happens to include unique data record values that are not coarsified, then each data record group within the set of correlated columns will consist of at most one tuple. A tuple is a single data record row of the database table. As a result, the multi-column data record summary table for the set of correlate columns is increased in size and the effectiveness of processing analytical queries using the multi-column data record summary table is reduced.

Furthermore, coarsifying data record values within correlated columns may lead to discovering additional correlations among seemingly uncorrelated columns, while the uncorrelated columns remain in a non-coarsified state or form. It should be noted that the process for identifying sets of correlated columns also may include the process for coarsifying sets of correlated columns. Therefore, the processes of identifying and coarsifying correlated columns may not necessarily be linear in order, but may be interconnected.

Moreover, coarsifying correlated column sets process 400 may reorder data record rows within correlated columns after coarsification of data record values. For example, coarsifying correlated column sets process 400 may logically reorder rows of data records 408 based on data record values. For example, because data record value $b_1$ in row 3 of correlated column B is less than data record value $b_3$ in row 1, coarsifying correlated column sets process 400 may logically reposition row 3 to where row 1 is currently positioned and reposition row 1 to where row 3 is currently positioned.

Figure 5:
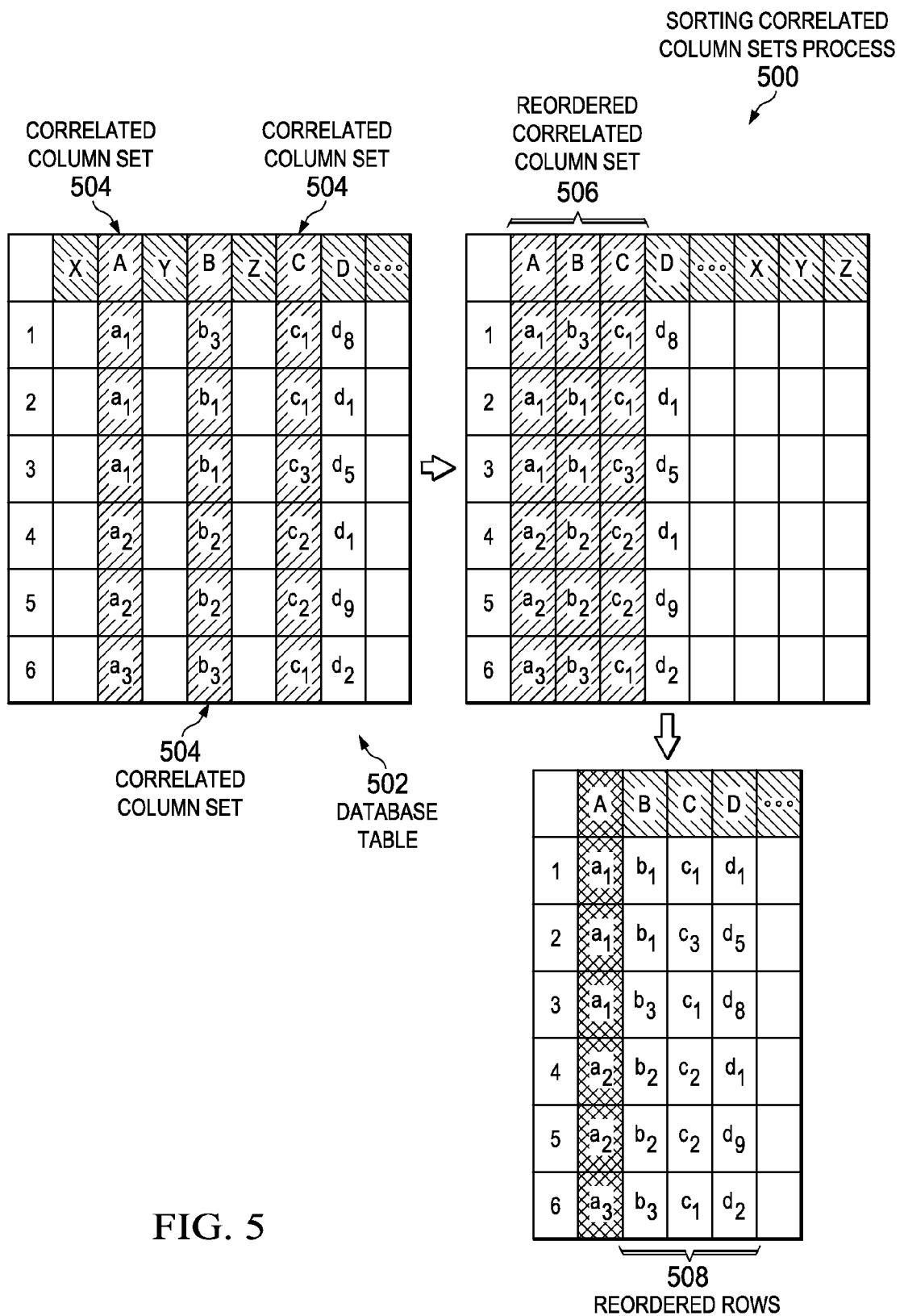
FIG. 5 is a diagram illustrating a process for sorting correlated column sets in accordance with an illustrative embodiment.

With reference now to FIG. 5, a diagram illustrating a process for sorting correlated column sets is depicted in accordance with an illustrative embodiment. Sorting correlated column sets process 500 may be implemented in a computer, such as data processing system 200 in FIG. 2.

Sorting correlated column sets process 500 utilizes database table 502, such as database table 402 in FIG. 4. In this example, database table 502 includes correlated column set 504, such as correlated column set 308 in FIG. 3.

Once illustrative embodiments discover and coarsify columns A, B, and C of correlated column set 504, sorting correlated column sets process 500 logically reorganizes database table 502 and sorts all the data records accordingly. For example, sorting correlated column sets process 500 logically reorganizes columns A, B, and C into reordered correlated column set 506. Reordered correlated column set 506 includes each of the correlated columns in correlated column set 504 within an ordered contiguous block of correlated columns. Sorting correlated column sets process 500 logically positions all other non-correlated columns within database table 502 after the ordered contiguous block of correlated columns. In addition, sorting correlated column sets process 500 logically sorts and reorders rows of data record values in columns B, C, and D to produce reordered rows 508.

Figure 6:
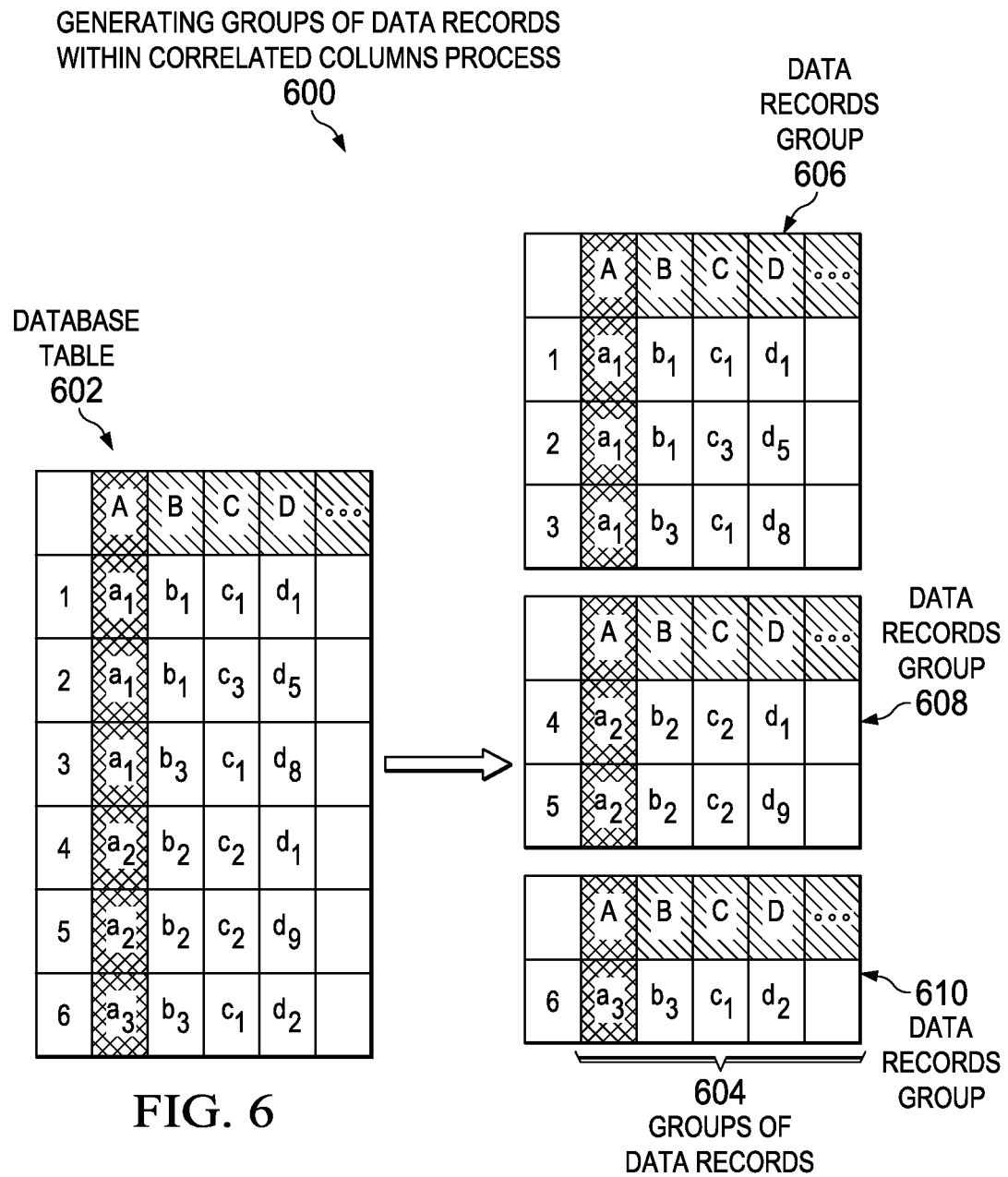
FIG. 6 is a diagram illustrating a process for generating groups of data records within correlated columns in accordance with an illustrative embodiment.

With reference now to FIG. 6, a diagram illustrating a process for generating groups of data records within correlated columns is depicted in accordance with an illustrative embodiment. Generating groups of data records within correlated columns process 600 may be implemented in a computer, such as data processing system 200 in FIG. 2. Generating groups of data records within correlated columns process 600 utilizes database table 602. Database table 602 may be, for example, database table 502 with reordered rows 508 in FIG. 5.

Once illustrative embodiments identify, coarsify, and sort correlated columns A, B, and C, generating groups of data records within correlated columns process 600 logically segments the data records of correlated columns A, B, and C into different groups of data records, such as groups of data records 604. In this example, groups of data records 604 include three different groups of data records (i.e., data record group 606, data record group 608, and data record group 610).

In this example, generating groups of data records within correlated columns process 600 logically generates the different data record groups based on data record values within correlated column A. In other words, generating groups of data records within correlated columns process 600 utilizes column A as a sort column. However, it should be noted that alternative illustrative embodiments may generate the different groups of data records based on data record values within any or all of the correlated columns or within a first predetermined number of correlated columns. For example, generating groups of data records within correlated columns process 600 may generate the different groups of coarsified data records based on data record values within the first $k^{th}$ number of aligned columns (ac) where:

$$ac=\{c_1,c_2,\ldots,c_k\},$$

$$nac=\{c_{k+1},c_{k+2},\ldots,c_n\},$$

$$(ml=ac \cup nac)^{\hat{}}(ac \cap nac=\emptyset).$$

Also, it should be noted that different illustrative embodiments may sort data record values at a data record level or at a data record group level. In this example, data record group 606 has a data record value of $a_1$ in rows 1-3 of column A, while data record group 608 and data record group 610 have data record values of $a_2$ in rows 4 and 5 and $a_3$ in row 6 of column A, respectively.

Figure 7:
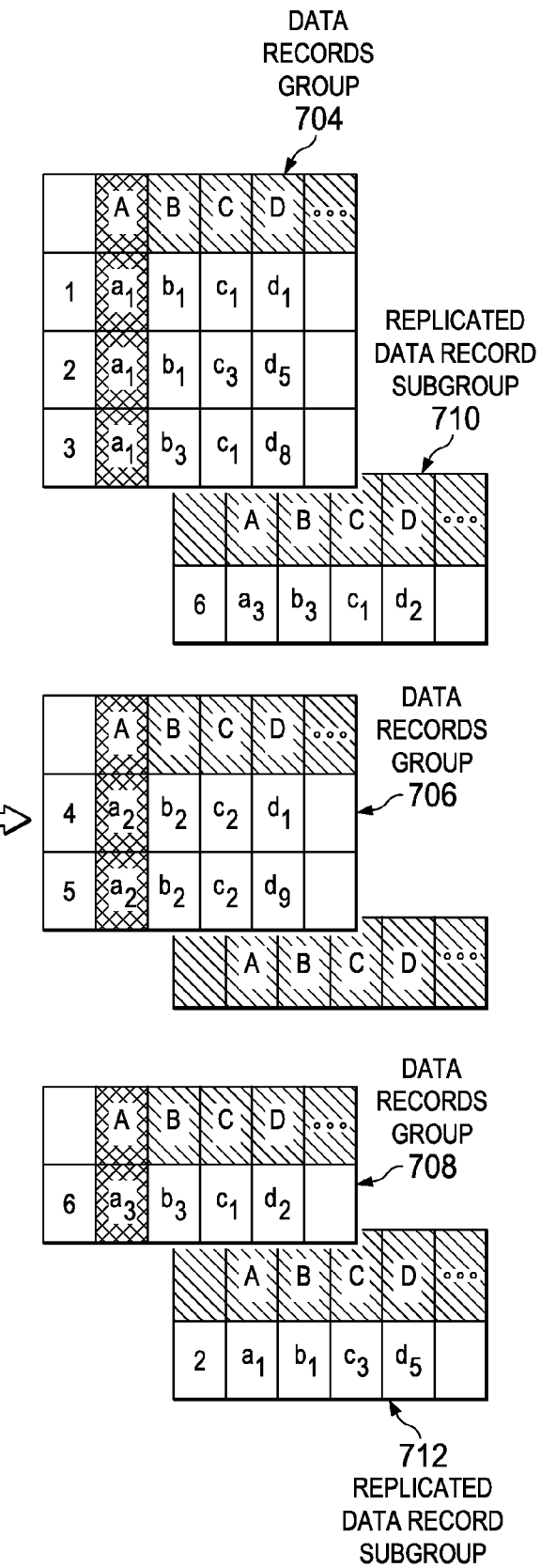
FIG. 7 is a diagram illustrating a process for generating replicated subgroups of data records in accordance with an illustrative embodiment.

With reference now to FIG. 7, a diagram illustrating a process for generating replicated subgroups of data records is depicted in accordance with an illustrative embodiment. Generating replicated subgroups of data records process 700 may be implemented in a computer, such as data processing system 200 in FIG. 2. Generating replicated subgroups of data records process 700 utilizes database table 702, such as database table 602 in FIG. 6.

Once illustrative embodiments segment database table 702 into data record group 704, data record group 706, and data record group 708, such as data record group 606, data record group 608, and data record group 610 in FIG. 6, generating replicated subgroups of data records process 700 aligns logically generated data record groups 704, 706, and 708 based on the set of correlated columns so that any query that has a predicate defined on any of the correlated columns can quickly prune or eliminate all the non-qualifying groups from the query result. Because the sort order and data record groups are generated based on the data record values within column A in this example, this pruning ability is satisfied for any queries that have at least one predicate defined on column A or on perfectly aligned correlated columns. However, if the query only has a predicate defined on column C, which is a correlated column, but is not perfectly aligned (e.g., all data record values that satisfy the predicate $C=c_1$), then it is not sufficient to just consider the first group of data records. Other data record groups must be considered individually because there is a miss alignment between the value of column A and C in the third group and they are not perfectly aligned. In order to avoid searching multiple data record groups unnecessarily, every data record group must be horizontally aligned. Therefore, any data records with a value $C=c_1$ must be replicated into the first group of data records, which has correlated column $A=a_1$ and correlated column $C=c_1$. It should be noted that the level of replication is proportional to the degree of correlation and since these columns are selected with a high degree of correlation, then replication is naturally reduced.

In this example, generating replicated subgroups of data records process 700 logically replicates corresponding replicated data record subgroup 710 for data record group 704. Replicated data record subgroup 710 corresponds to data record group 704 based on data record value $c_1$ in row 6 of correlated column C. In other words, the first data record group 704 and replicated data record subgroup 710 are now aligned because group 704 and subgroup 710 include all the data records within correlated columns A, B, and C that have the value$_1$. In addition, generating replicated subgroups of data records process 700 logically replicates corresponding replicated data record subgroup 712 for data record group 708. Replicated data record subgroup 712 corresponds to data record group 708 based on data record value $c_3$ in row 2 of correlated column C. In other words, the third data record group 708 and replicated data record subgroup 712 are now aligned because group 708 and subgroup 712 include all the data records within correlated columns A, B, and C that have the value$_3$. Generating replicated subgroups of data records process 700 does not logically replicate a corresponding data record subgroup for data record group 706 because data record group 706 is a perfectly aligned data record group. In other words, the second data record group 706 already includes all of the data records having the value$_2$. As a result, no replication of data records in needed to align data record group 706.

Alternative Formalism One: illustrative embodiments may align each group of data records by generating a virtually replicated aligned data record subgroup such that for each data record r∈I (i.e., horizontal data record alignment) if $$\forall r \in I, \exists c_i \cdot c_1 \neq g_i(r \cdot c_i) \Longrightarrow \exists r_j \in I_G, r_j \cdot c_1 = g_i(r \cdot c_i), r \in R_G,$$

where g( ) is a mapping function that maps a data record value in one domain or correlated column to another domain. It should be noted that the correlation mapping does not have to be based on identical data record values. For example, two seemingly different columns or domains, such as city and zip code, may in fact be correlated. In addition, not every group of data records has to be aligned. For example, columns may be correlated selectively only on part of the database table and only for those data record groups where generating replicated subgroups of data records process 700 is applied. Further, different sets of correlated columns may be identified for different parts of the database table.

Alternative Formalism Two: illustrative embodiments may align each group of data records by generating a virtually replicated aligned data record subgroup such that for each data record r∈I (i.e., horizontal data record alignment) if $$\forall r \in I, \exists c_i \cdot c_1 \neq g_i(r \cdot c_i) \Longrightarrow \exists I_G, I_G \cdot c_1 = g_i(r \cdot c_i), r \in R_G,$$

where g( ) is a mapping function that maps a data record value in one domain or correlated column to another domain. It should be noted that the correlation mapping does not have to be based on identical data record values. For example, two seemingly different columns or domains, such as city and zip code, may in fact be correlated. In addition, not every group of data records has to be aligned. For example, columns may be correlated selectively only on part of the database table and only for those data record groups where generating replicated subgroups of data records process 700 is applied. Further, different sets of correlated columns may be identified for different parts of the database table.

Figure 8:
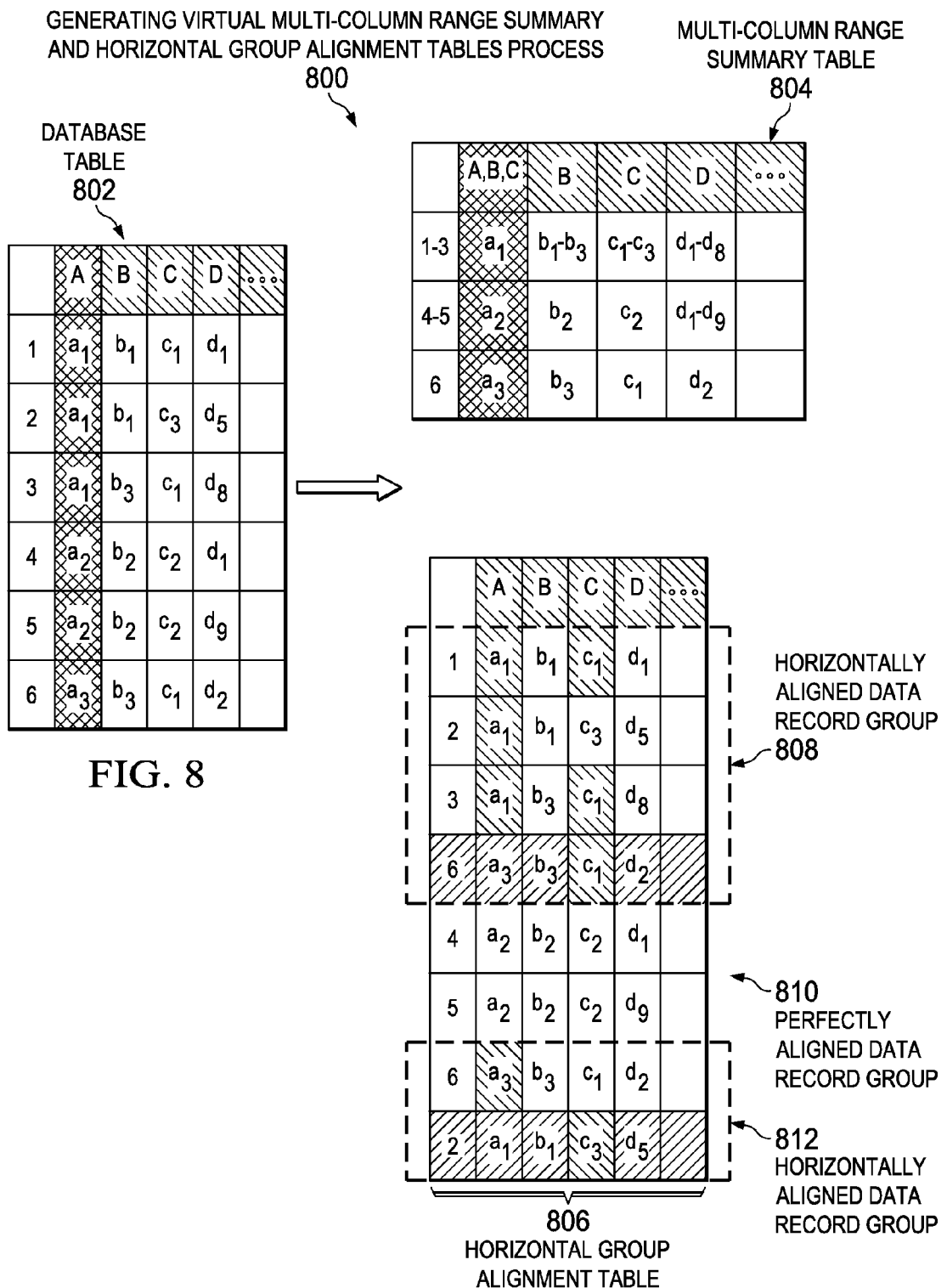
FIG. 8 is a diagram illustrating a process for generating virtual multi-column range summary and horizontal group alignment tables in accordance with an illustrative embodiment.

With reference now to FIG. 8, a diagram illustrating a process for generating virtual multi-column range summary and horizontal group alignment tables is depicted in accordance with an illustrative embodiment. Generating virtual multi-column range summary and horizontal group alignment tables process 800 may be implemented in a computer, such as data processing system 200 in FIG. 2. Generating virtual multi-column range summary and horizontal group alignment tables process 800 utilizes database table 802, such as database table 702 in FIG. 7.

Once illustrative embodiments virtually generate replicated data record subgroups for corresponding groups of data records, generating virtual multi-column range summary and horizontal group alignment tables process 800 may generate multi-column range summary table 804 for horizontal group alignment table 806. Horizontal group alignment table 806 includes horizontally aligned data record group 808, perfectly aligned data record group 810, and horizontally aligned data record group 812. Horizontally aligned data record group 808 may be, for example, horizontally aligned data record group 704 and replicated data record subgroup 710 in FIG. 7. Perfectly aligned data record group 810 may be, for example, data record group 706 in FIG. 7 that did not require replication of a corresponding data record subgroup. Horizontally aligned data record group 812 may be, for example, horizontally aligned data record group 708 and replicated data record subgroup 712 in FIG. 7.

Multi-column range summary table 804 is a summary of data record values across all of the columns (i.e., A, B, C, D, . . . ) of horizontal group alignment table 806 based on different groups of data records (i.e., the first group with value $a_1$ in rows 1-3, the second group with value $a_2$ in rows 4 and 5, and the third group with value $a_3$ in row 6). It should be noted that multi-column range summary table 804 also includes the data record values of replicated subgroups that correspond to the original non-replicated groups of data records.

Figure 9:
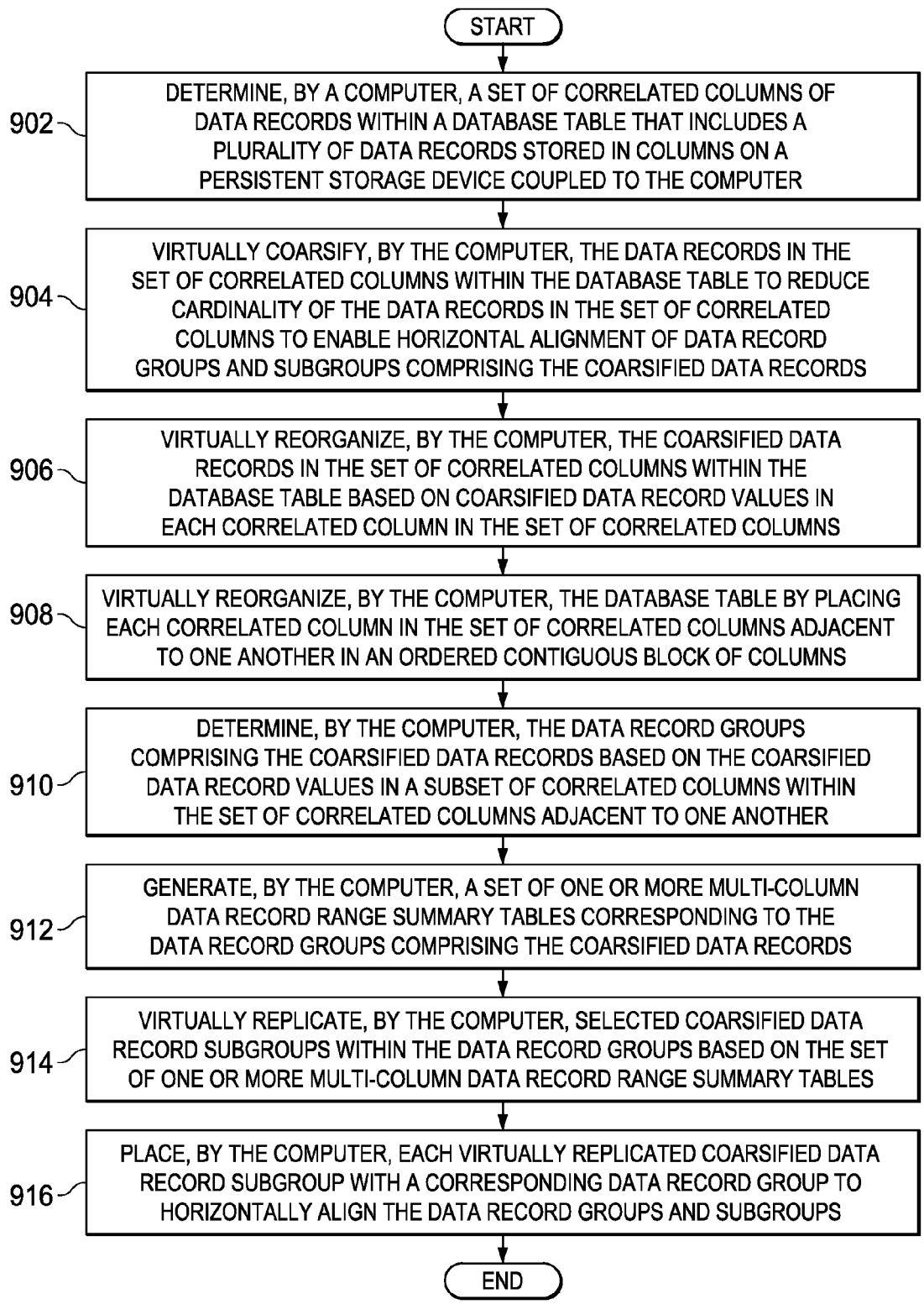
FIG. 9 is a flowchart illustrating a process for organizing database records into different groups in accordance with an illustrative embodiment.

With reference now to FIG. 9, a flowchart illustrating a process for organizing database records into different groups is shown in accordance with an illustrative embodiment. The process shown in FIG. 9 may be implemented in a computer, such as, for example, data processing system 200 in FIG. 2.

The process begins when the computer determines a set of correlated columns of data records within a database table that includes a plurality of data records stored in columns on a persistent storage device coupled to the computer (step 902). The set of correlated columns within the database table may be, for example, correlated column set 504 within database table 502 in FIG. 5. The persistent storage device coupled to the computer may be, for example, storage 108 in FIG. 1 or persistent storage 208 in FIG. 2.

In addition, the computer virtually coarsifies the data records in the set of correlated columns within the database table to reduce cardinality of the data records in the set of correlated columns to enable horizontal alignment of data record groups and subgroups comprising the coarsified data records (step 904). Afterward, the computer virtually reorganizes the coarsified data records in the set of correlated columns within the database table based on coarsified data record values in each correlated column in the set of correlated columns (step 906). The computer also virtually reorganizes the database table by placing each correlated column in the set of correlated columns adjacent to one another in an ordered contiguous block of columns (step 908). It should be noted that the computer may perform one or more of steps 904-908 physically instead of virtually.

Subsequently, the computer determines the data record groups comprising the coarsified data records based on the coarsified data record values in a subset of correlated columns within the set of correlated columns adjacent to one another (step 910). Further, the computer generates a set of one or more multi-column data record range summary tables corresponding to the data record groups comprising the coarsified data records (step 912). It should be noted that a multi-column range summary table may span multiple data record groups. Furthermore, the computer virtually replicates selected coarsified data record subgroups within the data record groups based on the set of one or more multi-column data record range summary tables (step 914). Then, the computer places each virtually replicated coarsified data record subgroup with a corresponding data record group to horizontally align the data record groups and subgroups (step 916). The process terminates thereafter.

Figure 10B:
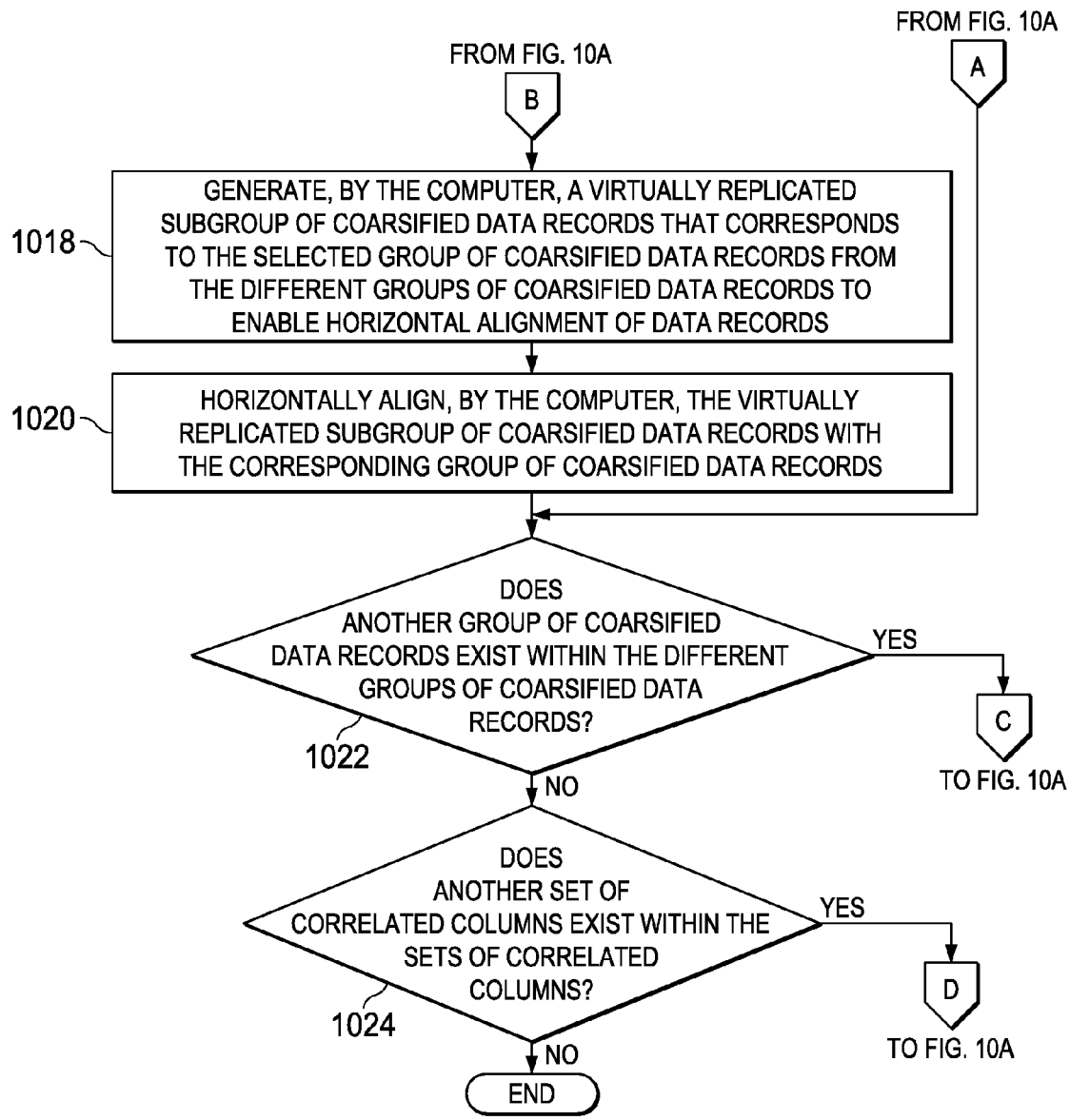

With reference now to FIGS. 10A-10B, a flowchart illustrating a process for horizontally aligning data record groups and replicated subgroups is shown in accordance with an illustrative embodiment. The process shown in FIGS. 10A-10B may be implemented in a computer, such as, for example, data processing system 200 in FIG. 2.

The process begins when the computer analyzes a distribution of data record values within a database table that includes a plurality of data records stored in columns on a persistent storage device coupled to the computer (step 1002). Subsequently, the computer determines sets of correlated columns, such as correlated column set 308 and correlated column set 310 in FIG. 3, within the database table based on the analyzed distribution of the data record values within the database table (step 1004). Afterward, the computer selects a set of correlated columns from the sets of correlated columns within the database table based on a selected data record query workload history (step 1006).

In addition, the computer virtually orders the selected set of correlated columns into an ordered contiguous block of correlated columns at a beginning of the database table, such as reordered correlated column set 506 in FIG. 5 (step 1008). The computer also virtually coarsifies data records within the selected set of correlated columns (step 1010). Then, the computer virtually segments the coarsified data records within the selected set of correlated columns into different groups of coarsified data records based on coarsified data record values in a subset of correlated columns within the selected set of correlated columns (step 1012).

Subsequently, the computer selects a group of coarsified data records within the different groups of coarsified data records (step 1014). Afterward, the computer makes a determination as to whether the selected group of coarsified data records is a perfectly aligned data record group (step 1016). A perfectly aligned data record group may be, for example, data record group 706 in FIG. 7 or perfectly aligned data record group 810 in FIG. 8. If the computer determines that the selected group of coarsified data records is a perfectly aligned data record group, yes output of step 1016, then the process proceeds to step 1022. If the computer determines that the selected group of coarsified data records is not a perfectly aligned data record group, no output of step 1016, then the computer generates a virtually replicated subgroup of coarsified data records that corresponds to the selected group of coarsified data records from the different groups of coarsified data records to enable horizontal alignment of data records (step 1018).

In addition, the computer horizontally aligns the virtually replicated subgroup of coarsified data records with the corresponding group of coarsified data records (step 1020). Subsequently, the computer makes a determination as to whether another group of coarsified data records exists within the different groups of coarsified data records (step 1022). If the computer determines that another group of coarsified data records does exist within the different groups of coarsified data records, yes output of step 1022, then the process returns to step 1014 where the computer selects another group of coarsified data records. If the computer determines that another group of coarsified data records does not exist within the different groups of coarsified data records, no output of step 1022, then the computer makes a determination as to whether another set of correlated columns exists within the sets of correlated columns (step 1024).

If the computer determines that another set of correlated columns does exist within the sets of correlated columns, yes output of step 1024, then the process returns to step 1006 where the computer selects another set of correlated columns. If the computer determines that another set of correlated columns does not exist within the sets of correlated columns, no output of step 1024, then the process terminates thereafter.

Figure 11:
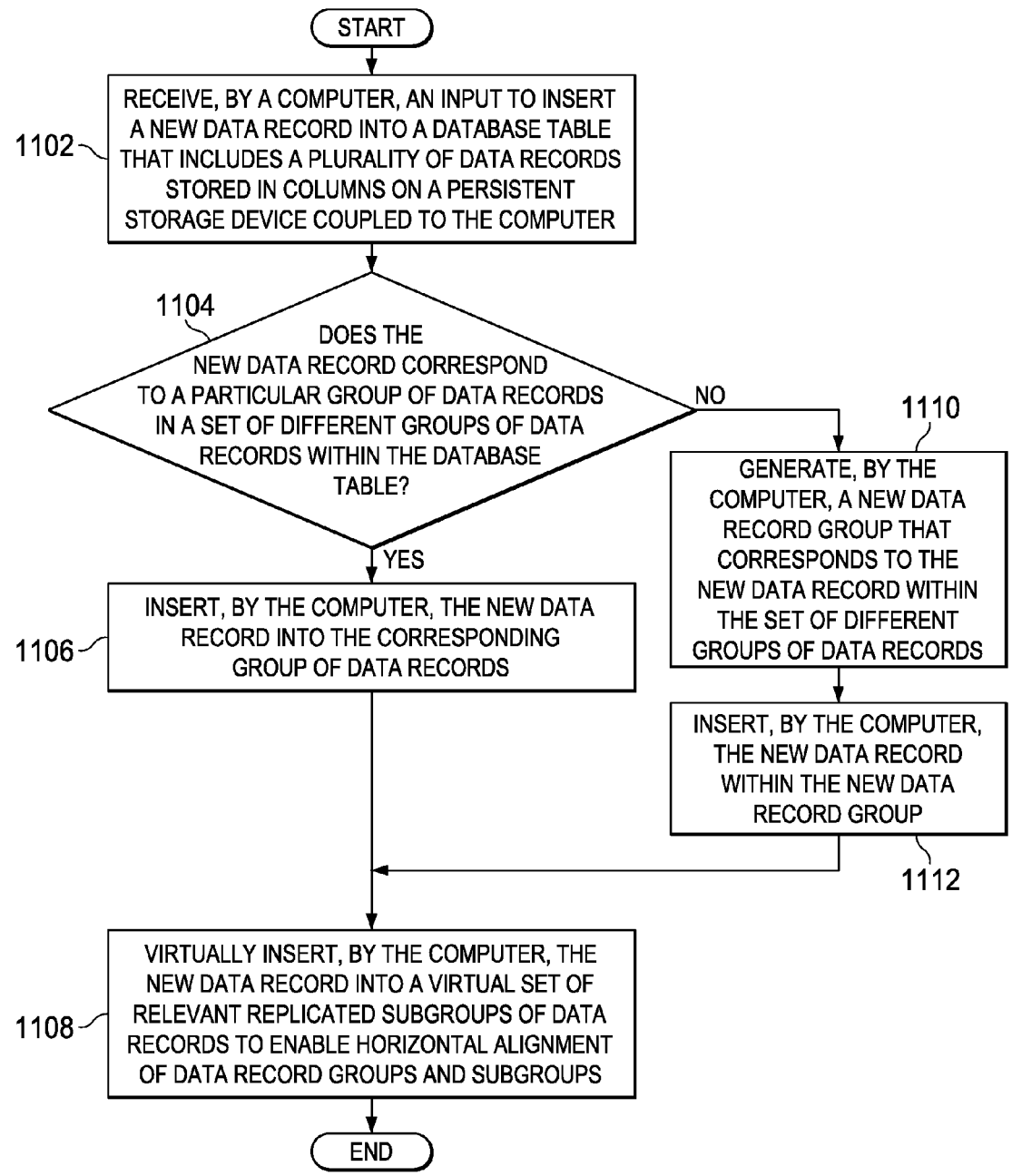
FIG. 11 is a flowchart illustrating a process for inserting a data record into a database table in accordance with an illustrative embodiment.

With reference now to FIG. 11, a flowchart illustrating a process for inserting a data record into a database table is shown in accordance with an illustrative embodiment. The process shown in FIG. 11 may be implemented in a computer, such as, for example, data processing system 200 in FIG. 2.

The process begins when the computer receives an input to insert a new data record into a database table that includes a plurality of data records stored in columns on a persistent storage device coupled to the computer (step 1102). Afterward, the computer makes a determination as to whether the new data record corresponds to a particular group of data records in a set of different groups of data records within the database table (step 1104). The set of different groups of data records may be, for example, data record groups 606-610 in FIG. 6. If the computer determines that the new data record does correspond to a particular group of data records in the set of different groups of data records within the database table, yes output of step 1104, then the computer inserts the new data record into the corresponding group of data records (step 1106). In addition, the computer virtually inserts the new data record into a virtual set of relevant replicated subgroups of data records to enable horizontal alignment of data record groups and subgroups (step 1108). Thereafter, the process terminates.

Returning again to step 1104, if the computer determines that the new data record does not correspond to a particular group of data records in the set of different groups of data records within the database table, no output of step 1104, then the computer generates a new data record group that corresponds to the new data record within the set of different groups of data records (step 1110). Afterward, the computer inserts the new data record within the new data record group (step 1112). Thereafter, the process returns to step 1108 where the computer also virtually inserts the new data record into a virtual set of relevant replicated subgroups of data records.

With reference now to FIG. 12, a flowchart illustrating a process for deleting a data record from a database table is shown in accordance with an illustrative embodiment. The process shown in FIG. 12 may be implemented in a computer, such as, for example, data processing system 200 in FIG. 2.

The process begins when the computer receives an input to delete a data record from a database table that includes a plurality of data records stored in columns on a persistent storage device coupled to the computer (step 1202). Subsequently, the computer deletes the data record from a corresponding group of data records in a set of different groups of data records within the database table (step 1204). Further, the computer logically deletes the data record from a virtual set of relevant replicated subgroups of data records to maintain horizontal alignment of data record groups and subgroups (step 1206). Thereafter, the process terminates.

With reference now to FIG. 13, a flowchart illustrating a process for updating a data record is shown in accordance with an illustrative embodiment. The process shown in FIG. 13 may be implemented in a computer, such as, for example, data processing system 200 in FIG. 2.

The process begins when the computer receives an input to update a data record within a database table that includes a plurality of data records stored in columns on a persistent storage device coupled to the computer (step 1302). In response, the computer deletes the data record from a corresponding group of data records in a set of different groups of data records within the database table (step 1304). In addition, the computer logically deletes the data record from a virtual set of relevant replicated subgroups of data records (step 1306).

Further, the computer inserts the updated data record into the corresponding group of data records in the set of different groups of data records within the database table (step 1308). The computer also virtually inserts the updated data record into the virtual set of relevant replicated subgroups of data records to enable horizontal alignment of data record groups and subgroups (step 1310). Thereafter, the process terminates.

Figure 14:
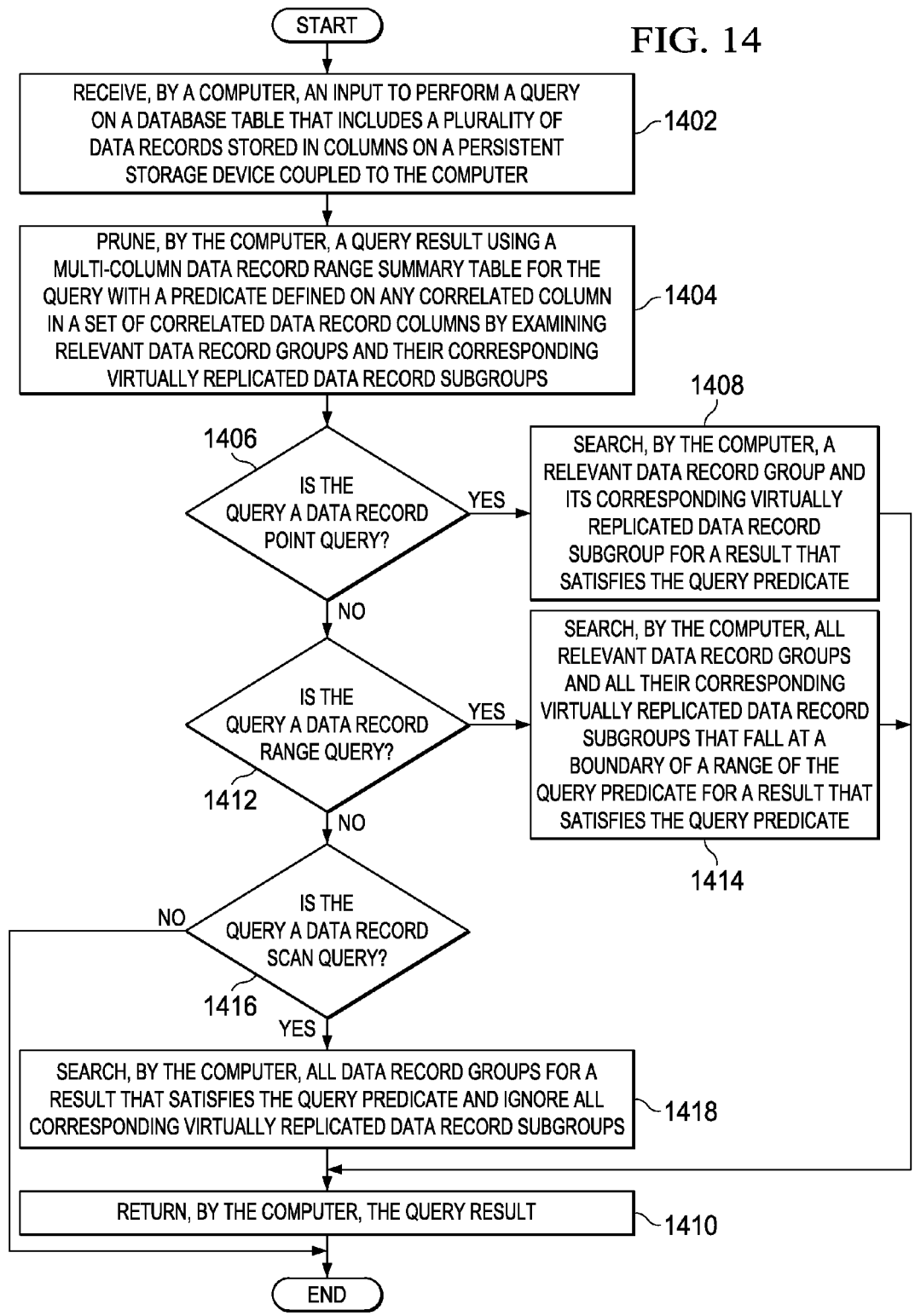
FIG. 14 is a flowchart illustrating a process for processing a database query in accordance with an illustrative embodiment.

With reference now to FIG. 14, a flowchart illustrating a process for processing a database query is shown in accordance with an illustrative embodiment. The process shown in FIG. 14 may be implemented in a computer, such as, for example, data processing system 200 in FIG. 2.

The process begins when the computer receives an input to perform a query on a database table that includes a plurality of data records stored in columns on a persistent storage device coupled to the computer (step 1402). Afterward, the computer prunes a query result using a multi-column data record range summary table for the query with a predicate defined on any correlated column in a set of correlated data record columns by examining relevant data record groups and their corresponding virtually replicated data record subgroups (step 1404). The multi-column data record range summary table may be, for example, multi-column range summary table 804 in FIG. 8.

Further, the computer makes a determination as to whether the query is a data record point query (step 1406). If the computer determines that the query is a data record point query, yes output of step 1406, then the computer searches a relevant data record group and its corresponding virtual replicated data record subgroup for a result that satisfies the query predicate (step 1408). Subsequently, the computer returns the query result (step 1410). Thereafter, the process terminates.

Returning again to step 1406, if the computer determines that the query is not a data record point query, no output of step 1406, then the computer makes a determination as to whether the query is a data record range query (step 1412). If the computer determines that the query is a data record range query, yes output of step 1412, then the computer searches all relevant data record groups and all their corresponding virtual replicated data record subgroups that fall at a boundary of a range of the query predicate for a result that satisfies the query predicate (step 1414). Thereafter, the process returns to step 1410 where the computer returns the query result.

Returning again to step 1412, if the computer determines that the query is not a data record range query, no output of step 1412, then the computer makes a determination as to whether the query is a data record scan query (step 1416). If the computer determines that the query is a data record scan query, yes output of step 1416, then the computer searches all data record groups for a result that satisfies the query predicate and ignores all corresponding virtual replicated data record subgroups (step 1418). Thereafter, the process returns to step 1410 where the computer returns the query result. If the computer determines that the query is not a data record scan query, no output of step 1416, then the process terminates thereafter.

Thus, illustrative embodiments provide a computer-implemented method, computer system, and computer program product for processing analytical database queries using a multi-column range summary table of horizontally aligned data record groups and subgroups within a set of correlated columns of data records. As a result, illustrative embodiments decrease processing time associated with analytical queries through data record skipping using the multi-column range summary table and not using indexes. In addition, illustrative embodiments decrease update overhead costs because indexes are not utilized by the illustrative embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for decreasing processing time of database queries by a computer, the computer-implemented method comprising:

determining, by the computer, that a group of correlated data record columns within a database table is not horizontally aligned with a different group of correlated data record columns;

responsive to the computer determining that the group of correlated data record columns within the database table is not horizontally aligned with the different group of correlated data record columns, generating, by the computer, a virtually replicated row of data records that includes one or more values in the group of correlated data record columns from the different group of correlated data record columns within the database table; and horizontally aligning, by the computer, the virtually replicated row of data records with the group of correlated data record columns by placing the virtually replicated row of data records with the group of correlated data record columns so that a database query having a predicate defined on correlated data record columns eliminates non-qualifying groups of correlated data record columns to decrease the processing time of the computer.

2. The computer-implemented method of claim 1, further comprising:

receiving, by the computer, an input to perform a query on the database table; and pruning, by the computer, non-qualifying groups of correlated data record columns from a query result using a set of one or more multi-column data record range summary tables for the query with a predicate defined on any correlated column in a set of correlated columns of data records within the database table by examining relevant groups of correlated data record columns and their corresponding virtually replicated data record rows in the set of one or more multi-column data record range summary tables.

3. The computer-implemented method of claim 2, further comprising:
determining, by the computer, that the query is a data record range query; and
responsive to the computer determining that the query is a data record range query, searching, by the computer, all relevant groups of correlated data record columns and all their corresponding virtually replicated data record rows that fall at a boundary of a range of a query predicate for a result that satisfies the query predicate.

4. The computer-implemented method of claim 1, further comprising:
determining, by the computer, that a new data record corresponds to a particular group of correlated data record columns in a set of different groups of correlated data record columns within the database table;
responsive to the computer determining that the new data record corresponds to the particular group of correlated data record columns in the set of different groups of correlated data record columns within the database table, inserting, by the computer, the new data record into a corresponding group of data record columns; and
inserting, by the computer, the new data record into a virtual set of replicated rows of data records to horizontally align different groups of correlated data record columns and their corresponding virtually replicated rows of data records having same data record values.

5. The computer-implemented method of claim 1, further comprising:
receiving, by the computer, an input to delete a data record from the database table;
deleting, by the computer, the data record from a corresponding group of correlated data record columns in a set of different groups of correlated data record columns within the database table; and
deleting, by the computer, the data record from a virtual set of replicated rows of data records to maintain horizontal alignment of different groups of correlated data record columns and their corresponding virtually replicated rows of data records having same data record values.

6. The computer-implemented method of claim 1, further comprising:
receiving, by the computer, an input to update a data record within the database table;
deleting, by the computer, the data record from a corresponding group of correlated data record columns in a set of different groups of correlated data record columns within the database table;
deleting, by the computer, the data record from a virtual set of replicated rows of data records;
inserting, by the computer, the updated data record into the corresponding group of correlated data record columns in the set of different groups of correlated data record columns within the database table; and
inserting, by the computer, the updated data record into the virtual set of replicated rows of data records to horizontally align different groups of correlated data record columns and their corresponding virtually replicated rows of data records having same data record values.

7. The computer-implemented method of claim 1, further comprising:
determining, by the computer, a set of correlated columns of data records within the database table;
virtually coarsifying, by the computer, the data records in the set of correlated columns to reduce cardinality of data record values in the set of correlated columns;
virtually reorganizing, by the computer, coarsified data record rows in the set of correlated columns based on coarsified data record values in each correlated column;
determining, by the computer, data record groups comprising the coarsified data records based on the coarsified data record values in a subset of correlated columns within the set of correlated columns; and
generating, by the computer, a set of one or more multi-column data record range summary tables corresponding to the data record groups comprising the coarsified data records.

8. The computer-implemented method of claim 7, further comprising:
analyzing, by the computer, a distribution of data record values within the database table to determine the set of correlated columns of data records.

9. The computer-implemented method of claim 7, further comprising:
virtually ordering, by the computer, the set of correlated columns of data records into an ordered contiguous block of correlated columns at a beginning of the database table.

10. The computer-implemented method of claim 7, further comprising:
virtually segmenting, by the computer, the coarsified data records within the set of correlated columns into different groups of coarsified data records based on the coarsified data record values in a first correlated column within the set of correlated columns.

11. A computer for decreasing processing time of database queries, the computer comprising:
a bus system;
a computer readable storage device connected to the bus system, wherein the computer readable storage device stores computer readable program code; and
a hardware processor connected to the bus system, wherein the hardware processor executes the computer readable program code to determine that a group of correlated data record columns within a database table is not horizontally aligned with a different group of correlated data record columns; generate a virtually replicated row of data records that corresponds to includes one or more values in the group of correlated data record columns from the different group of correlated data record columns within the database table in response to determining that the group of correlated data record columns within the database table is not horizontally aligned with the different group of correlated data record columns; and horizontally align the virtually replicated row of data records with the group of correlated data record columns by placing the virtually replicated row of data records with the group of correlated data record columns so that a database query having a predicate defined on correlated data record columns eliminates non-qualifying groups of correlated data record columns to decrease the processing time of the computer.

12. The computer of claim 11, wherein the hardware processor further executes the computer readable program code to receive an input to perform a query on the database table; and prune non-qualifying groups of correlated data record columns from a query result using a set of one or more multi-column data record range summary tables for the query with a predicate defined on any correlated column in a set of correlated columns of data records within the database table by examining relevant groups of correlated data record columns and their corresponding virtually replicated data record rows in the set of one or more multi-column data record range summary tables.

13. The computer of claim 12, wherein the hardware processor further executes the computer readable program code to determine that the query is a data record range query; and search all relevant groups of correlated data record columns and all their corresponding virtually replicated data record rows that fall at a boundary of a range of a query predicate for a result that satisfies the query predicate in response to determining that the query is a data record range query.

14. The computer of claim 11, wherein the hardware processor further executes the computer readable program code to determine that a new data record corresponds to a particular group of correlated data record columns in a set of different groups of correlated data record columns within the database table; insert the new data record into a corresponding group of data record columns in response to determining that the new data record corresponds to the particular group of correlated data record columns in the set of different groups of correlated data record columns within the database table; and insert the new data record into a virtual set of replicated rows of data records to horizontally align different groups of correlated data record columns and virtually replicated rows of data records having same data record values.

15. The computer of claim 11, wherein the hardware processor further executes the computer readable program code to receive an input to delete a data record from the database table; delete the data record from a corresponding group of correlated data record columns in a set of different groups of correlated data record columns within the database table; and delete the data record from a virtual set of replicated rows of data records to maintain horizontal alignment of different groups of correlated data record columns and their corresponding virtually replicated rows of data records having same data record values.

16. A computer program product stored on a computer readable storage medium having computer readable program code encoded thereon that is executable by a computer for decreasing processing time of database queries by the computer, the computer program product comprising:
computer readable program code to determine that a group of correlated data record columns within a database table is not horizontally aligned with a different group of correlated data record columns;
computer readable program code to generate a virtually replicated row of data records that includes one or more values in the group of correlated data record columns from the different group of correlated data record columns within the database table in response to determining that the group of correlated data record columns within the database table is not horizontally aligned with the different group of correlated data record columns; and
computer readable program code to horizontally align the virtually replicated row of data records with the group of correlated data record columns by placing the virtually replicated row of data records with the group of correlated data record columns so that a database query having a predicate defined on correlated data record columns eliminates non-qualifying groups of correlated data record columns to decrease the processing time of the computer.

17. The computer program product of claim 16, further comprising:
computer readable program code to receive an input to perform a query on the database table; and
computer readable program code to prune non-qualifying groups of correlated data record columns from a query result using a set of one or more multi-column data record range summary tables for the query with a predicate defined on any correlated column in a set of correlated columns of data records within the database table by examining relevant groups of correlated data record columns and their corresponding virtually replicated data record rows in the set of one or more multi-column data record range summary tables.

18. The computer program product of claim 17, further comprising:
computer readable program code to determine that the query is a data record range query; and
computer readable program code to search all relevant groups of correlated data record columns and all their corresponding virtually replicated data record rows that fall at a boundary of a range of a query predicate for a result that satisfies the query predicate in response to determining that the query is a data record range query.

19. The computer program product of claim 16, further comprising:
computer readable program code to that a new data record corresponds to a particular group of correlated data record columns in a set of different groups of correlated data record columns within the database table;
computer readable program code to insert the new data record into a corresponding group of data record columns in response to determining that the new data record corresponds to the particular group of correlated data record columns in the set of different groups of correlated data record columns within the database table; and
computer readable program code to insert the new data record into a virtual set of replicated rows of data records to horizontally align different groups of correlated data record columns and virtually replicated rows of data records having same data record values.

20. The computer program product of claim 16, further comprising:
computer readable program code to receive an input to delete a data record from the database table;
computer readable program code to delete the data record from a corresponding group of correlated data record columns in a set of different groups of correlated data record columns within the database table; and
computer readable program code to delete the data record from a virtual set of replicated rows of data records to maintain horizontal alignment of different groups of correlated data record columns and their corresponding virtually replicated rows of data records having same data record values.

21. The computer program product of claim 16, further comprising:
computer readable program code to receive an input to update a data record within the database table;
computer readable program code to delete the data record from a corresponding group of correlated data record columns in a set of different groups of correlated data record columns within the database table;

computer readable program code to delete the data record from a virtual set of replicated rows of data records;

computer readable program code to insert the updated data record into the corresponding group of correlated data record columns in the set of different groups of correlated data record columns within the database table; and computer readable program code to insert the updated data record into the virtual set of replicated rows of data records to horizontally align different groups of correlated data record columns and their corresponding virtually replicated rows of data records having same data record values.

22. The computer program product of claim 16, further comprising:

computer readable program code to determine a set of correlated columns of data records within the database table;

computer readable program code to virtually coarsify the data records in the set of correlated columns to reduce cardinality of data record values in the set of correlated columns;

computer readable program code to virtually reorganize coarsified data record rows in the set of correlated columns based on coarsified data record values in each correlated column;

computer readable program code to determine data record groups comprising the coarsified data records based on the coarsified data record values in a subset of correlated columns within the set of correlated columns; and computer readable program code to generate a set of one or more multi-column data record range summary tables corresponding to the data record groups comprising the coarsified data records.

23. The computer program product of claim 22, further comprising:

computer readable program code to analyze a distribution of data record values within the database table to determine the set of correlated columns of data records.

24. The computer program product of claim 22, further comprising:

computer readable program code to virtually order the set of correlated columns of data records into an ordered contiguous block of correlated columns at a beginning of the database table.

25. The computer program product of claim 22, further comprising:

computer readable program code to virtually segment the coarsified data records within the set of correlated columns into different groups of coarsified data records based on the coarsified data record values in a first correlated column within the set of correlated columns.

* * * * *